(12) United States Patent
Jung

(10) Patent No.: US 8,654,081 B2
(45) Date of Patent: Feb. 18, 2014

(54) MOBILE TERMINAL

(75) Inventor: Yun Taek Jung, Incheon-si (KR)

(73) Assignee: LG Electronics Inc., Seoul (KR)

( * ) Notice: Subject to any disclaimer, the term of this patent is extended or adjusted under 35 U.S.C. 154(b) by 838 days.

(21) Appl. No.: 12/695,299

(22) Filed: Jan. 28, 2010

(65) Prior Publication Data

US 2010/0265184 A1    Oct. 21, 2010

(30) Foreign Application Priority Data

Apr. 17, 2009   (KR) .................. 10-2009-0033774

(51) Int. Cl.
| G09G 5/00 | (2006.01) |
| G09G 3/36 | (2006.01) |
| G06F 3/02 | (2006.01) |
| F21V 7/04 | (2006.01) |

(52) U.S. Cl.
USPC ............. 345/169; 345/87; 345/156; 345/168; 362/600; 362/602

(58) Field of Classification Search
USPC ........................................................ 345/169
See application file for complete search history.

(56) References Cited

U.S. PATENT DOCUMENTS

| 2003/0201983 A1* | 10/2003 | Jokinen et al. ................ 345/169 |
| 2004/0095743 A1* | 5/2004 | Yu et al. ........................... 362/31 |
| 2005/0062410 A1* | 3/2005 | Bell et al. ....................... 313/506 |
| 2007/0109810 A1* | 5/2007 | Park et al. ...................... 362/615 |
| 2008/0007964 A1* | 1/2008 | Lin ................................. 362/602 |

* cited by examiner

*Primary Examiner* — Sumati Lefkowitz
*Assistant Examiner* — Andrew Yeretsky
(74) *Attorney, Agent, or Firm* — Birch, Stewart, Kolasch & Birch, LLP

(57) ABSTRACT

A mobile terminal is disclosed, by which the feel of manipulation of a mobile terminal keypad is enhanced and by which brightness deviation of keypad illumination is minimized. The present invention includes at least one or more light sources, a keypad having a plurality of manipulating buttons, each having a button protrusion provided to a bottom of the corresponding manipulating button, a light guide film configured to have light provided by the at least one light source enter a lateral side thereof, the light guide film having a plurality of insertion holes configured to have the button protrusions pass through, respectively, and a printed circuit board having a dome switch pressurized by the button protrusion of the keypad and an electrode part selectively coming contact with the dome switch, wherein a width of at least one of the insertion holes provided to the light guide film is different from a length thereof.

16 Claims, 13 Drawing Sheets

FIG. 11
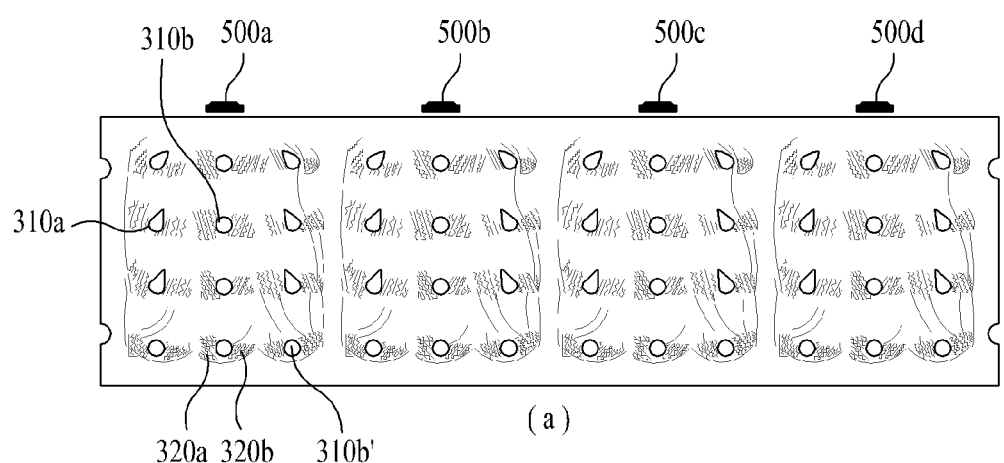
(a)
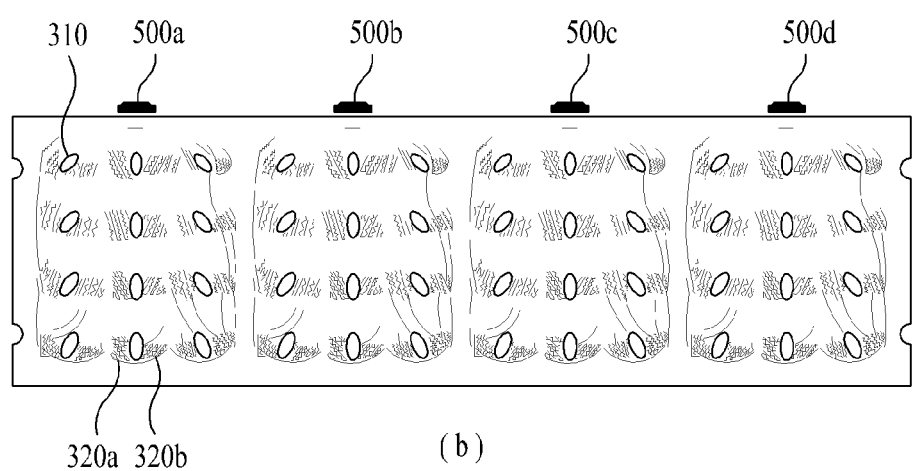
(b)

FIG. 12
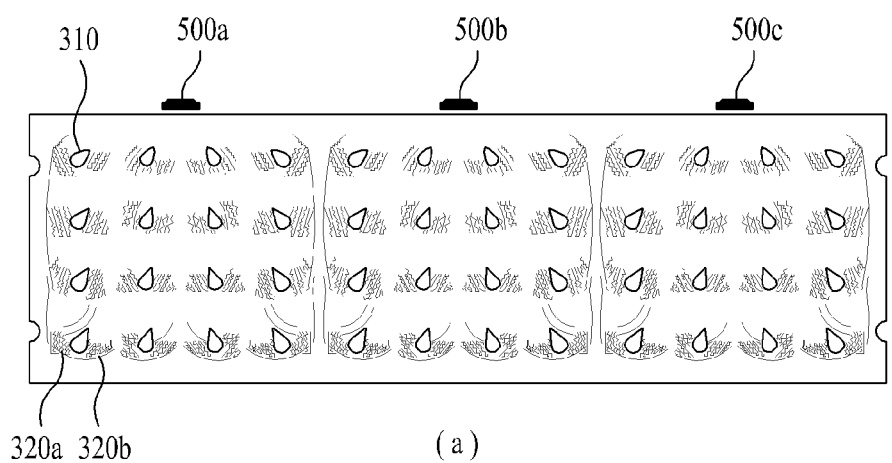
(a)
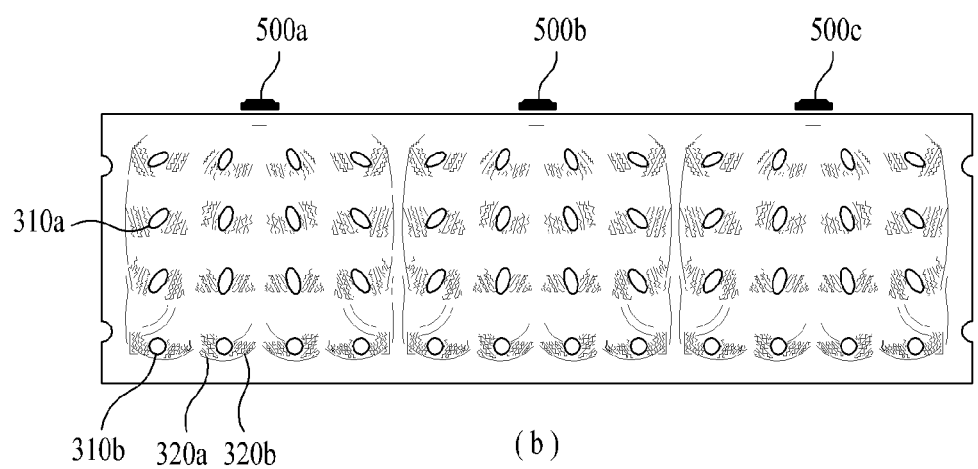
(b)

FIG. 13
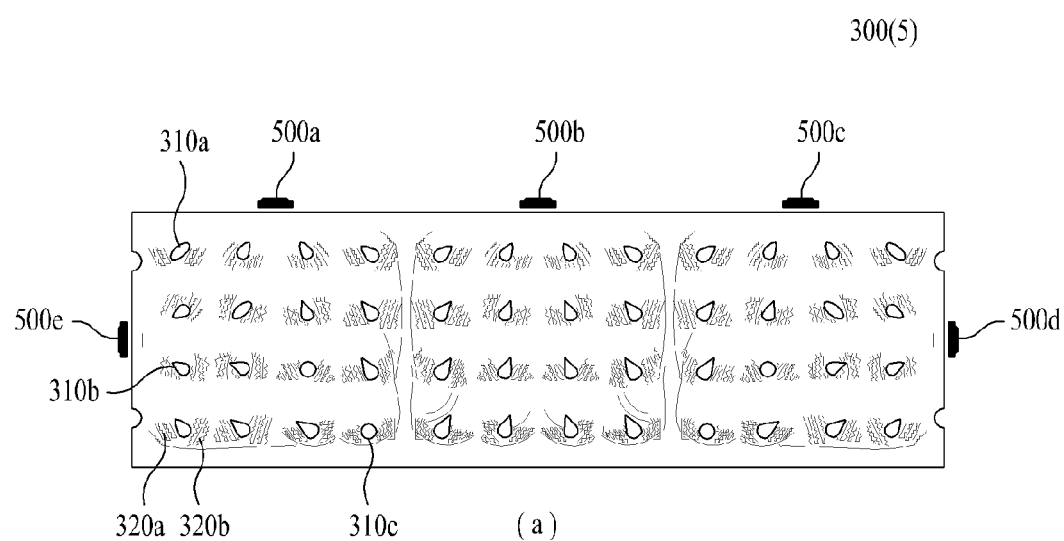
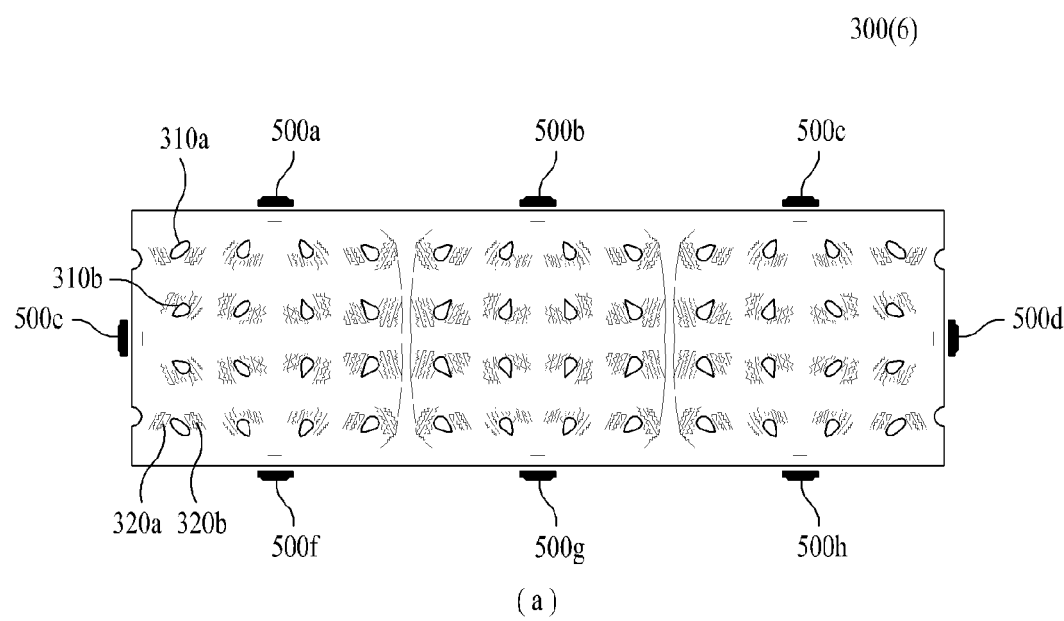

MOBILE TERMINAL

This application claims the benefit of the Korean Patent Application No. 10-2009-0033774, filed on Apr. 17, 2009, which is hereby incorporated by reference as if fully set forth herein.

BACKGROUND OF THE INVENTION

1. Field of the Invention

The present invention relates to a mobile terminal. Although the present invention is suitable for a wide scope of applications, it is particularly suitable for enhancing the feel of manipulation of a mobile terminal keypad and minimizing brightness deviation of keypad illumination.

2. Discussion of the Related Art

Generally, terminals can be categorized into mobile/portable terminals and stationary terminals according to a presence or non-presence of portability.

As functions of the terminal tend to be diversified, the terminal is implemented as a multimedia player type equipped with composite functions including picture or video photographing, music or video file playback, games, broadcast reception and the like for example.

A mobile terminal can be provided with at least one user input unit enabling a user to control the mobile terminal. For instance, the at least one user input unit includes a keypad, a touchpad and the like.

As a display provided to a front side of a recently introduced mobile terminal consists of a touchpad capable of detecting a touch input, the display itself is usually used as a user input unit.

Yet, the mobile terminal tends to be provided with a separate keypad for inputting numerals or characters as well as a touchpad.

And, the keypad is provided with a plurality of manipulating buttons having different user inputs assigned thereto and each of the manipulating buttons are normally provided with an illumination function.

Since an independent light source is provided for each of the manipulating buttons provided to the keypad, a corresponding cost is raised. Therefore, the illumination function is preferably provided in a manner that light sources are provided less than the manipulating buttons to share light provided by the light sources.

In order to share illumination by providing light sources of which number is smaller than that of manipulating buttons, it is able to use a light guide film.

The light guide film includes a sheet formed of a transparent material. Laterally incident light experiences total internal reflection to be supplied under each manipulating button.

If the light source is shared using the light guide film, thickness caused by the light source can be reduced smaller than that caused in case of arranging a light source under a manipulating button. Therefore, an overall thickness of a mobile terminal is reduced to provide a slim mobile terminal.

However, when the light guide film is provided under the keypad, if the corresponding manipulating button is pressed, the corresponding pressure is delivered to a dome switch provided under the light guide film. Therefore, a manipulation feel of the manipulating button is degraded. In particular, when a manipulating button is pressed, a user applies a force greater than that used for a case that a light guide film is not used. Therefore, the user may feel fatigue.

Moreover, in case of using a light guide film, a deviation of brightness can be generated in accordance with a position of a manipulating button of a keypad or a distance from a light source.

SUMMARY OF THE INVENTION

Accordingly, the present invention is directed to a mobile terminal that substantially obviates one or more problems due to limitations and disadvantages of the related art.

An object of the present invention is to provide a mobile terminal, by which the feel of manipulation of a mobile terminal keypad is enhanced.

Another object of the present invention is to provide a mobile terminal, by which brightness deviation of keypad illumination is minimized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes at least one or more light sources, a keypad having a plurality of manipulating buttons, each having a button protrusion provided to a bottom of the corresponding manipulating button, a light guide film configured to have light provided by the at least one light source enter a lateral side thereof, the light guide film having a plurality of insertion holes configured to have the button protrusions pass through, respectively, and a PCB (printed circuit board) having a dome switch pressurized by the button protrusion of the keypad and an electrode part selectively coming contact with the dome switch, wherein a width of at least one of the insertion holes provided to the light guide film is different from a length thereof.

Preferably, the width of the insertion hole having the length different from the width increases in a length direction of the corresponding insertion hole and then decreases.

More preferably, at least two light sources are provided in the vicinity of the lateral side of the light guide film by being spaced from each other and one length-direction end portion of the insertion hole having the width and the length differing from each other is arranged toward a center portion of the light source located in shortest distance among the at least one or more light sources.

In this case, the insertion hole having the width and the length differing from each other is the insertion hole provided to an edge portion of the light guide film.

Preferably, a projected height of the button protrusion is greater than a thickness of the light guide film.

In another aspect of the present invention, a mobile terminal includes a plurality of LED (light emitting diode or LED package), a keypad having a plurality of manipulating buttons having a plurality of button protrusions provided to bottoms thereof, respectively, a light guide film configured to have light provided by at least one of the LEDs enter a lateral side thereof, the light guide film having at least one pattern part configured with a plurality of patterns and a plurality of insertion holes configured to have the button protrusions pass through, respectively, and a circuit board having a plurality of dome switches pressurized by the button protrusions of the keypad, respectively, wherein a width of at least one of the insertion holes provided to the light guide film is different from a length thereof and wherein the width increases in a length direction and then decreases.

Preferably, a plurality of the LEDs are provided in the vicinity of the lateral side of the light guide film by being spaced apart from each other.

Preferably, a narrower one of both length-direction end portions of the insertion hole having the width and the length differing from each other is configured to face the LED located in shortest distance among a plurality of the LEDs.

Preferably, a numeral, character and/or symbol is marked on the manipulating button such that the light provided by the corresponding LED is transmitted, the pattern part is provided to a portion opposing the numeral, character and/or symbol of the manipulating button, and density of a plurality of the patterns configuring the pattern part is inverse proportional to a distance from the LED located in shortest distance among a plurality of the LEDs.

More preferably, each of the button protrusions is provided under a region in which the numeral, character and/or symbol of the corresponding manipulating button is not marked.

In this case, the button protrusion is provided to a position opposing a center portion of the corresponding manipulating button and wherein the numeral, character and/or symbol is marked in either a left or right region of the corresponding manipulating button.

And, the pattern part is provided to either a left or right region of the corresponding insertion hole.

Preferably, the at least one pattern part includes a plurality of the patterns and each of a plurality of the patterns includes a scratch formed on a surface of the light guide film.

Preferably, at least one of a plurality of the insertion holes has a circular shape.

More preferably, the circular insertion hole is provided to a position where a plurality of the LEDs are provided.

Preferably, the insertion hole having the width and the length differing from each other has an oval shape, or a water drop shape having one length-direction end narrower than the other length-direction end.

More preferably, a distance between the circular insertion hole and the LED located in a shortest distance is equal to or greater than a predetermined distance.

Preferably, a plurality of the LEDs are provided in the vicinity of at least two selected from the group consisting of upper, lower, left and right lateral sides of the light guide film.

More preferably, a plurality of the insertion holes provided to the light guide film have shapes of at least two types.

More preferably, at least one of shapes of the insertion holes is a water drop shape having one length-direction end narrower than the other length-direction end or an oval shape having one length-direction end equal in width to the other length-direction end.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 shows a case that total 4 light sources of LEDs (500a, 500b, 500c, 500d) provided to an upper lateral side of the light guide film 300-3;

FIG. 12 shows a case that total 3 light sources of LEDs (500a, 500b, 500c) provided to an upper lateral side of the light guide film; and FIG. 13 shows a case that light sources of LEDs provided to upper, right, left and lower lateral sides of the light guide film.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present specification, it is preferably understood that a mobile terminal includes such a portable or handheld terminal as a mobile phone, a smart phone, a notebook computer, a digital broadcast terminal, a PDA (personal digital assistants), a PMP (portable multimedia player), a navigation system and the like.

In the following description, a mobile terminal according to the present invention is explained in detail with reference to the accompanying drawings.

First of all, elements constructing a mobile terminal according to the present invention are described in aspect of functionality.

Figure 1:
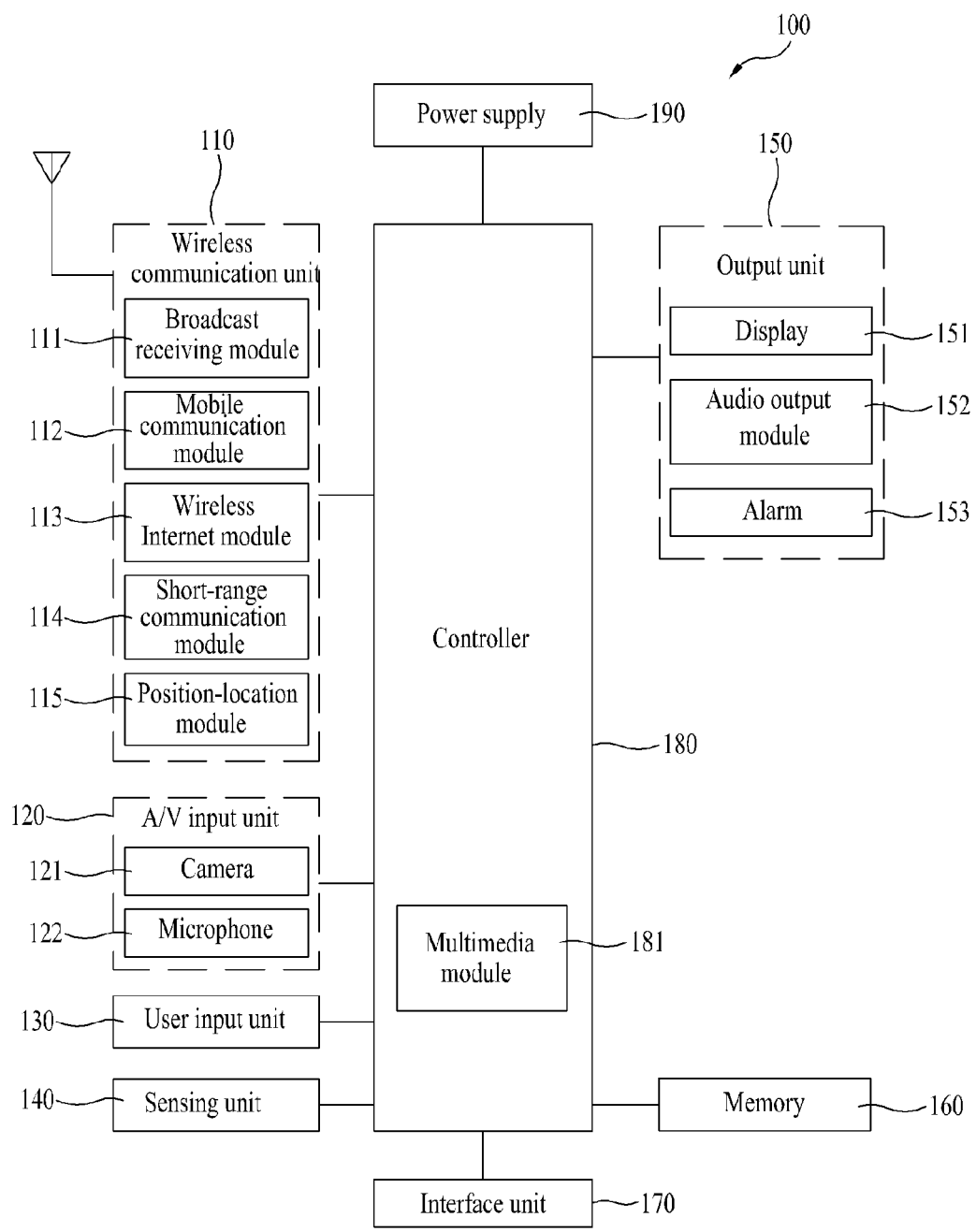
FIG. 1 is a block diagram of a mobile terminal according to one embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

In particular, in case that a touchpad constructs a mutual layer structure with the display 151, it can be called a touchscreen.

The sensing unit 140 detects such a current configuration of the mobile terminal 100 as an open/closed configuration of the mobile terminal 100, a location of the mobile terminal 100, a presence or non-presence of user contact and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The output unit 150 is configured to output an audio signal, a video signal and/or an alarm signal. And, the output unit 150 can include the display 151, an audio output module 152, an alarm output module 153 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The memory 160 can store programs for the processing and control of the controller 180 and is also able to perform a function for temporary storage of inputted/outputted data (e.g., phonebook data, message data, still picture data, moving picture data, etc.).

The memory 160 can include at least one storage medium of such a type as a flash memory type, a hard disk type, a multimedia card micro type, a card type memory (e.g., SD memory, XD memory, etc.), RAM and ROM. Moreover, the mobile terminal 100 is able to operate a web storage that performs a storage function of the memory 160 on internet.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

And, the power supply 190 receives an external and/or internal power source and then supplies power required for operations of the respective components, under the control of the controller 180.

In the above description so far, the mobile terminal according to the present invention is described in aspect of the components according to functionality. In the following description, a mobile terminal according to the present invention shall be described with reference to FIG. 2 and FIG. 3 in aspect of components according to an exterior of the mobile terminal. For clarity, a slider type mobile terminal is taken as an example for the description from mobile terminals of various types including a folder type, a bar type, a swing type and the like. Therefore, the present invention is non-limited by the slider type mobile terminal but is applicable to other mobile terminals of all types including the foregoing types.

Figure 2:
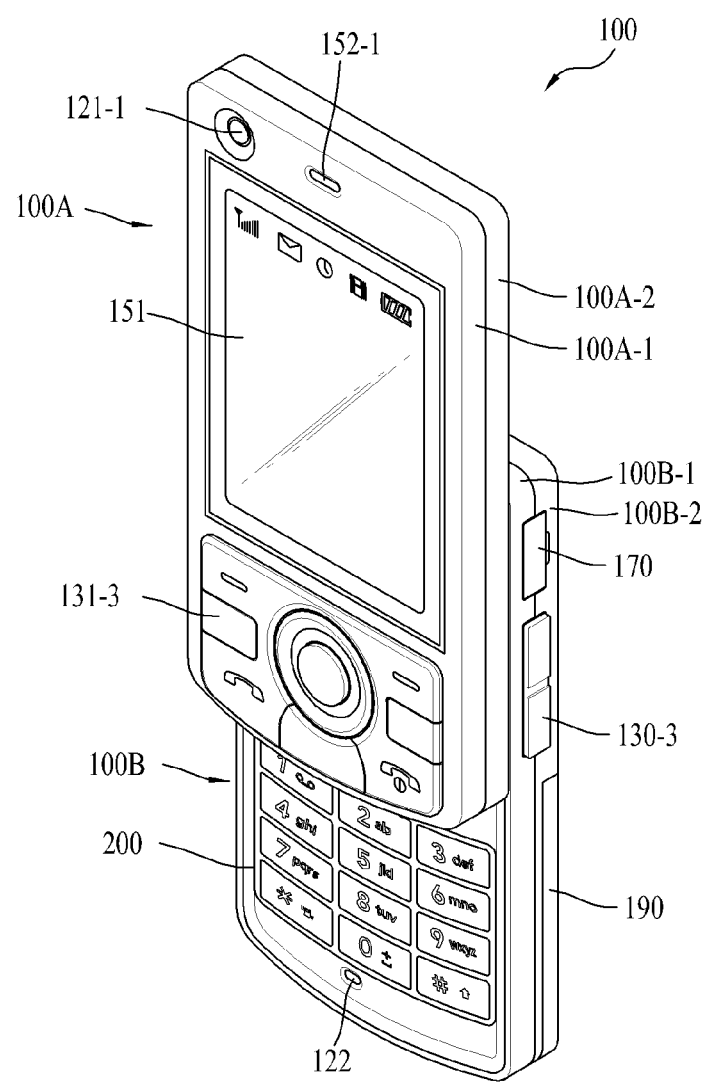
FIG. 2 is a front perspective diagram for an example of a mobile terminal according to the present invention.

FIG. 2 is a front perspective diagram for an example of a mobile terminal according to the present invention.

Referring to FIG. 2, a mobile terminal 100 according to the present invention includes a first body 100A and a second body 100B configured slidable on the first body 100A along at least one direction.

A closed configuration may indicate a state that the first body 100A is positioned to be overlapped with the second body 100B. And, an open configuration may indicate a state that the first body 100A is positioned to expose at least one portion of the second body 100B.

The mobile terminal 100 operates in a standby mode in the closed configuration. And, the standby mode can be released by a user's manipulation. The mobile terminal normally operates in a call mode or the like in the open configuration but can enter the standby mode according to a user's manipulation or expiration of prescribed duration.

A case configuring an exterior of the first body 100A includes a first front case 100A-1 and a first rear case 100A-2. Various electronic parts are loaded in a space provided by the first front case 100A-1 and the first rear case 100A-2. At least one or more middle cases can be additionally arranged between the first front case 100A-1 and the first rear case 100A-2.

Theses cases are formed by injection molding using synthetic resin or can be formed using metal substance such as stainless steel (STS), titanium (Ti) and the like.

In the first body 100A, and more particularly, in the first front case 100A-1, a display module 151, a first audio output module 152-1, a first camera module 121-1 and the like can be loaded. Optionally, a first user input unit 130-1 can be loaded in the first front case 100A-1/

The display module 151 includes such a device for displaying information visually as LCD (liquid crystal display), OLED organic light emitting diodes) display and the like.

If a touchpad is overlapped with the display module 151 to construct a layer structure, the display module 151 can work as a touchscreen to enable information to be inputted by a user's touch action.

The first audio output module 152-1 can be implemented as a receiver or a speaker.

The first camera module 121-1 can be implemented to facilitate user's image or moving picture to be taken.

And, the first user input unit (manipulating unit) 130-1 receives an input of a command for controlling an operation of the mobile terminal according to the present invention.

Like the first body 100A, a case configuring an exterior of the second body 100B includes a second front case 100B-1 and a second rear case 100B-2.

A second user input unit 130-2 can be provided to the second body 100B, and more particularly, to a front face of the second body 100B.

A third user input unit 130-3 and a microphone module 122 can be provided to at least one of the second front case 100B-1 and the second rear case 100B-2.

The first to third user input units 130-1, 130-2 and 130-3 can have a common name called a user input unit (manipulating portion) 130. And, the user input unit can adopt any system in a tactile manner enabling a user to perform manipulation with a tactile feel.

In aspect of functionality, the first user input unit 130-1 is provided to input such a command as start, end, scroll and the like. And, the second user input unit 130-2 is provided to input numerals, characters, symbols and/or the like.

The second user input unit 130-2 includes a keypad 200 configured to be externally exposed, a dome switch 415 a PCB (printed circuit board) provided under the keypad 200 and the like. In this case, the PCB includes a dome switch 415 and an electrode part 435 selectively contacted with the dome switch 415. Detailed configuration of the second user input unit 130-2 shall be described in detail later.

If the second user input unit 130-2 for inputting numerals, characters and/or symbols includes the keypad 200, the keypad 200 is provided with a plurality of manipulating buttons 215 pressurized by a user. According to the embodiment shown in FIG. 2, total 12 manipulating buttons 215 are provided.

Each of the manipulating buttons 215 is built in one body of the keypad 200 or can be attached to the keypad 200 one by one.

If a user presses one of the manipulating buttons 215 of the keypad 200, the dome switch 415 comes into contact with the electrode part 435 to generate a control signal. This will be explained later.

Numerals, characters and/or symbols are marked on the manipulating buttons 215, respectively. Each of the numerals, characters and/or symbols marked on the manipulating buttons 215 can be formed of light-transmittive material to transmit light.

Thus, the manipulating buttons 215 are formed light-transmittive to be provided with illumination functions. Therefore, a user is facilitated to manipulate the manipulating buttons 215 in controlling the mobile terminal located in a dark place. And, aesthetic beauty can be enhanced.

Accordingly, it is able to configure the numerals, characters and/or symbols provided to the manipulating buttons 215 to be lit bright by the illumination supplied from the bottom. Details of the shapes and actions for illuminating the manipulating buttons shall be explained later.

The third user input unit 130-3 can work as a hot-key for activating a special function within the mobile terminal.

The microphone module 122 can be implemented to be suitable for receiving an input of user's speech, other sound and the like.

The interface unit 170 becomes a passage for exchanging data and the like between the mobile terminal of the present invention and external devices. For instance, the interface 170 can include at least one of an access terminal for connection to an earphone by wire/wireless, a port for short-range communication (e.g., IrDA port, Bluetooth port, wireless LAN port, etc.), and power supply terminals for supplying power to the mobile terminal.

The interface unit 170 can include a card socket for receiving a subscriber identification module (SIM), a user identity module (UIM), or an external card such as a memory card for information storage and the like.

A power supply 190 for supplying power to the mobile terminal is provided to the second rear case 100B-2.

And, the power supply 190 can be detachably assembled as a rechargeable battery or the like for example.

Figure 3:
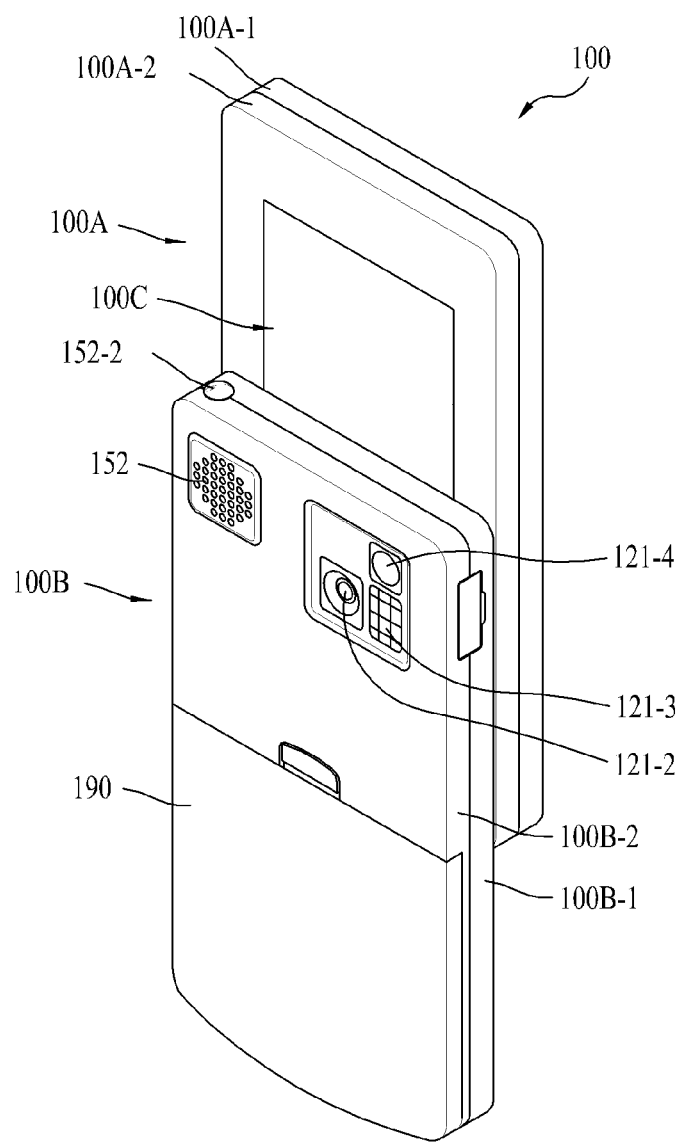
FIG. 3 is a rear perspective diagram of the mobile terminal shown in FIG. 2.

FIG. 3 is a rear perspective diagram of the mobile terminal shown in FIG. 2.

Referring to FIG. 3, a second camera module 121-2 can be further provided to a backside of the second rear case 100B-2 of the second body 100B. The second camera module 121-2 has a photographing direction substantially opposite to that of the first camera module 121-1 (cf. FIG. 1) and can have pixels different from those of the first camera module 121-1. For instance, the first camera module 121-1 preferably has low pixels to have no difficulty in photographing and sending a user's face in case of a video call or the like. Yet, the second camera module 121-2 takes a picture of a general subject and usually does not send the taken picture in direct. Hence, the second camera module 121-2 preferably has high pixels.

Optionally, a flash 121-3 and a mirror 121-4 are provided adjacent to the second camera module 121-2. When a subject is taken using the second camera module 121-2, the flash 121-3 projects light toward the subject. In case that a user attempts to take a picture of himself/herself using the second camera module 121-2 [self-photographing], the mirror 121-4 enables the user to see his/her face reflected on the mirror.

A second audio output module 152-2 can be further provided to the second rear case 100B-2.

The second audio output module 152-2 is able to implement a stereo function together with the first audio output module 152-1 (cf. FIG. 2). And, the second audio output module 152-2 is usable for a call in a speakerphone mode.

A broadcast signal receiving antenna 111-1 for a call and the like can be provided to one side of the second rear case 100B-2. This antenna 111-1 can be installed retractable from the second body 100B. Alternatively, the antenna 111-1 can be retractably installed at the first body 100A.

One portion of a slide module 100C can be provided to the first rear case 100A-2 of the first body 100A. In this case, the slide module 100C enables the first and second bodies 100A and 100B to be slidably assembled together.

The other portion of the slide module 100C is provided to the second front case 100B-1 of the second body 100B not to be externally exposed, as shown in the drawing.

The above description is explained in a manner that the second camera module 121-2 and the like are provided to the second body 100B, by which the present invention is non-limited.

For instance, at least one (e.g., the second camera module 121-2) of the components 111-1, 121-2, 121-3 and 152-2, which are described to be provided to the second rear case 100B-2, can be provided to the first body 100A, and more particularly, to the first rear case 100A-2. If so, it is advantageous in that the component(s) provided to the first rear case 100A-2 can be protected by the second body 100B in the closed configuration. Moreover, even if the second camera module 121-2 is not separately provided, the first camera module 121-1 is configured rotatably to enable photographing in a photographing direction of the second camera module 121-2 additionally.

Figure 4:
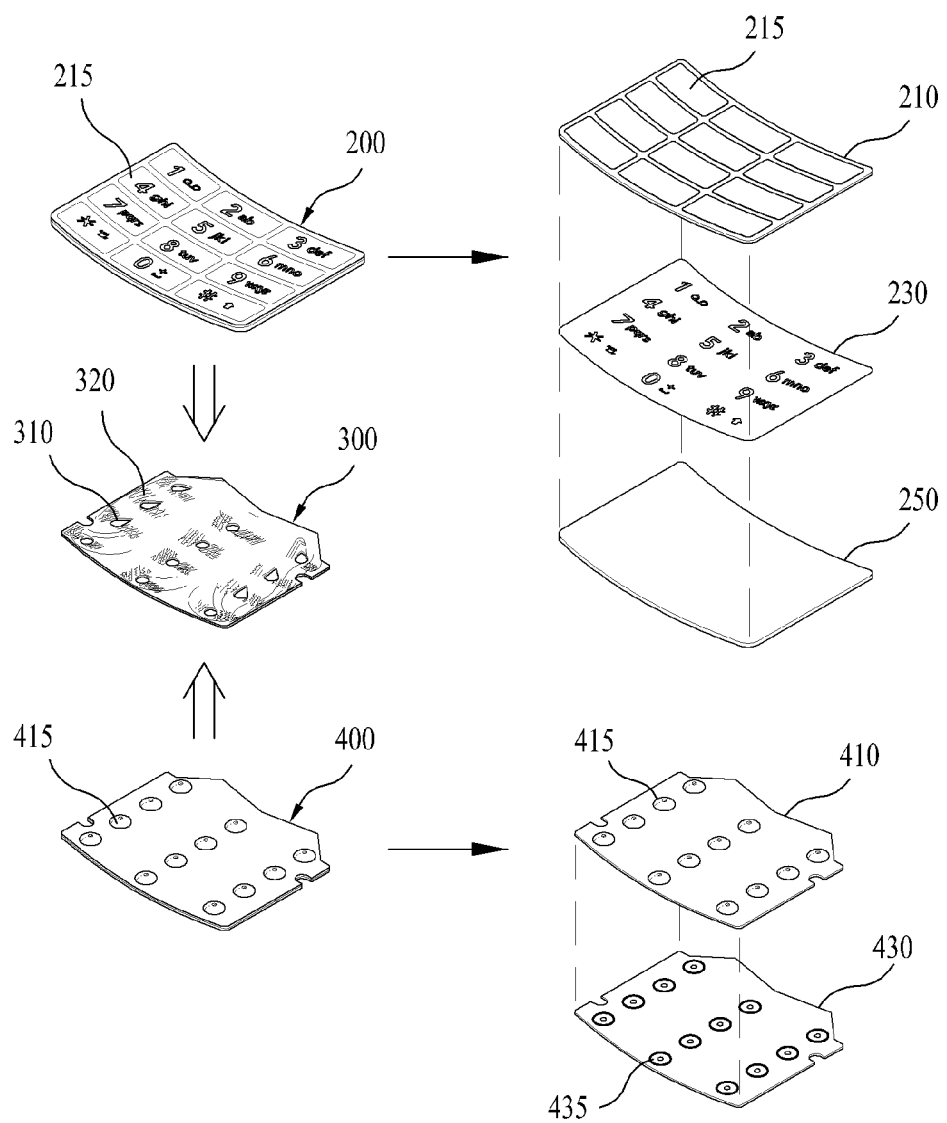
FIG. 4 is an exploded perspective diagram of a second user input unit of a mobile terminal according to the present invention.

FIG. 4 is an exploded perspective diagram of a second user input unit of a mobile terminal according to the present invention.

Referring to FIG. 4, a mobile terminal according to the present invention includes a keypad 200 having at least one light source (not shown in the drawing), a plurality of manipulating buttons and button protrusions provided to bottoms of the manipulating buttons, respectively, a light guide film 300 having a plurality of insertion holes configured to be respectively penetrated by the button protrusions, the light guide film 300 configured to enable light provided by the light source to be laterally incident therein, and a PCB (printed circuit board) 430 having dome switches 415 respectively pressurized by the button protrusions 255 (cf. FIG. 5) of the keypad 200 and an electrode part 455 selectively touched with the corresponding dome switch. In this case, at least one portion of the insertion holes provided to the light guide film 300 differ from each other in width and length.

The light guide film 300 can have at least one pattern part 320 including a plurality of patterns formed on a surface of the light guide film 300. Details of the pattern part 320 will be described later.

The second user input unit is provided in a manner that the keypad 200, the light guide film 300 and the PCB 400 having the dome switches 415 and the electrode part (not shown in the drawing) and the like are stacked on one another.

As mentioned in the foregoing description, a plurality of the manipulating buttons 215 are provided to the keypad 200. And, each of the manipulating buttons 215 generates a control signal by pressurizing the corresponding one of the dome switches 415 provided to the PCB 400. The keypad 200 can be provided in a manner that a top plate formed of such a material as plastics, metal and the like and a bottom plate formed of such a soft material as rubber and the like are attached together.

Moreover, a keypad film 230 can be further provided between the top plate and the bottom plate 250. In this case, numerals, characters, symbols and/or the like to be displayed on the manipulating buttons 215 are printed on the keypad film 230 to transit light therethrough.

Printing substance is printed on the keypad film 230 except portions for the numerals, characters, symbols and/or the like, whereby light projected from the below can pass through the numerals, characters, symbols and/or the like. In this case, the keypad film 230 can be formed of such material as polyurethane and the like.

The keypad 200 constructing the user input unit shown in FIG. 4 can adopt various forms.

Meanwhile, the light guide film 300 is provided under the keypad 200.

The light guide film 300 is provided in form of a transparent sheet and can be formed of such material as polycarbonate, polyurethane and the like.

When the manipulating button 215 pressurizes the bottom plate 250 of the keypad 200, a button protrusion (not shown in the drawing, cf. FIG. 5) for pressurizing the corresponding dome switch 415 of the PCB 400 can be built in one body of the bottom plate 250.

After the user input unit has been assembled, the button protrusion 255 penetrates into the insertion hole 310 provided to the light guide film 300 to be projected toward the dome switch 415.

If the light guide film 300 is adopted, it is advantageous in decrementing the number of light sources 500 provided for illumination functionality considerably and reducing the corresponding thickness. On the contrary, since a pressurizing force of the manipulating button 215 is delivered to the dome switch 415 via the light guide film 300, a feel of the manipulation is degraded. In order to solve the problem of the degraded feel of the manipulation, according to the present invention, an insertion hole 310 is provided to a position opposing the corresponding button protrusion 255 of the keypad to enable the button protrusion to pressurize the corresponding dome switch by passing through the light guide film 300 adopted for the illumination functionality.

At least one of the insertion holes 310 provided to the light guide film 300 can have the shape of water drop shown in FIG. 4 rather than the shape of perfect circle. In the following description, for clarity and convenience, an insertion hole shape having a length greater than a width, which increases in its length direction and then decreases, is named 'water drop shape' or 'oval shape'. The reason why the insertion hole 310 provided to the light guide film is formed to have the water drop shape shall be explained later.

If a width of one end of the insertion hole having the water-drop or oval shape, of which width and length differ from each other, is smaller than that of the other end, it can be regarded as a water drop shape. If the former width and the latter width are approximately identical to each other, it can be regarded as an oval shape.

Figure 5:
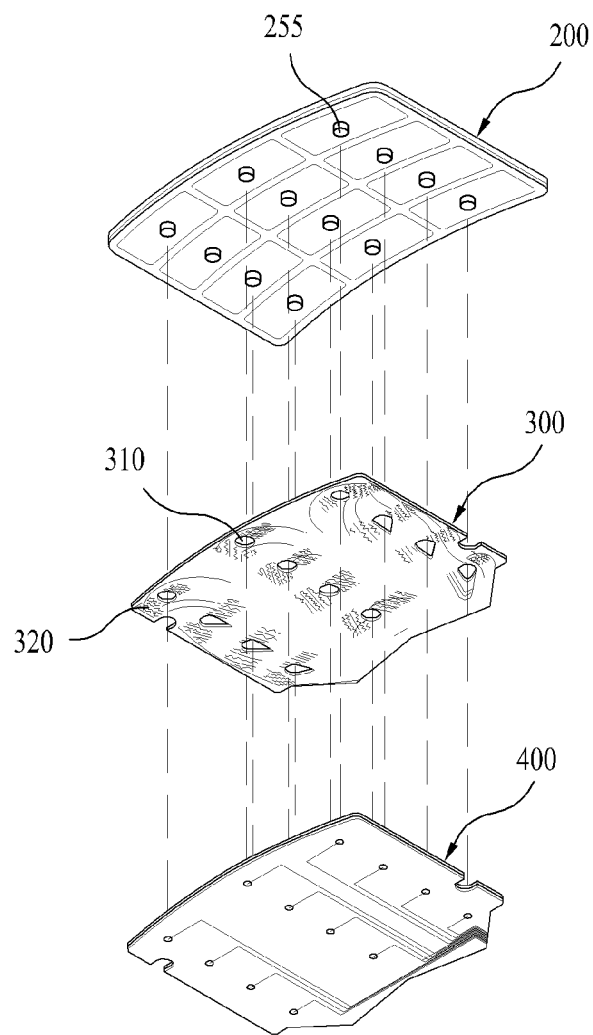
FIG. 5 is an exploded perspective diagram of a keypad, a light guide film and a PCB shown in FIG. 4.

FIG. 5 is an exploded perspective diagram of the keypad 200, the light guide film 300 and the PCB 400 shown in FIG. 4, in which the user input unit is viewed from a bottom side.

Referring to FIG. 5, the button protrusion 255 for pressurizing the dome switch 415 is built in one body of the bottom plate 250 configuring a lower part of the keypad 200. In this case, the bottom plate 250 can be formed of such a soft material as rubber and the like.

Preferably, the button protrusion 255 is formed to have a projected height enough to pressurize the dome switch 415 without an excessive force after the keypad 200, the light guide film 300 and the PCB 400 have been assembled together.

Since the button protrusion 255 needs to pressurize the dome switch 415 selectively by passing through the insertion hole 310 of the light guide film 300 located under the keypad 200, it can be configured to have a projected height equal to or greater than a thickness of the light guide film 300 at least.

Moreover, as mentioned in the foregoing description, since the insertion hole 310 provided to the light guide film 300 can be formed to have the water drop shape or the like, the button protrusion 255 can be inserted in a wider portion of the insertion hole 310. Therefore, a cross-sectional shape of the button protrusion 2255 should have a shape that can be inserted in the insertion hole 310.

For instance, the button protrusion 255 can be configured in a cylindrical shape.

Referring to FIG. 5, the keypad 200 is provided in a manner that the top plate 20, the keypad film 230 and the bottom plate 250 are attached or assembled together in one body.

Referring to FIG. 4 and FIG. 5, the button protrusion 255 is provided to a position that opposes the insertion hole 310 of the light guide film 300 and both of the dome switch 415 and the electrode part 435 of the PCB 400 and then generates a control signal attributed to a contact between the dome switch 415 and the electrode part 435 by the pressurization of the manipulating button 215.

In the following description, explained in detail is the light guide film 300 that provides illumination functionality below the manipulating button 215 in a manner of reflecting light provided by the light source totally and internally.

Figure 6:
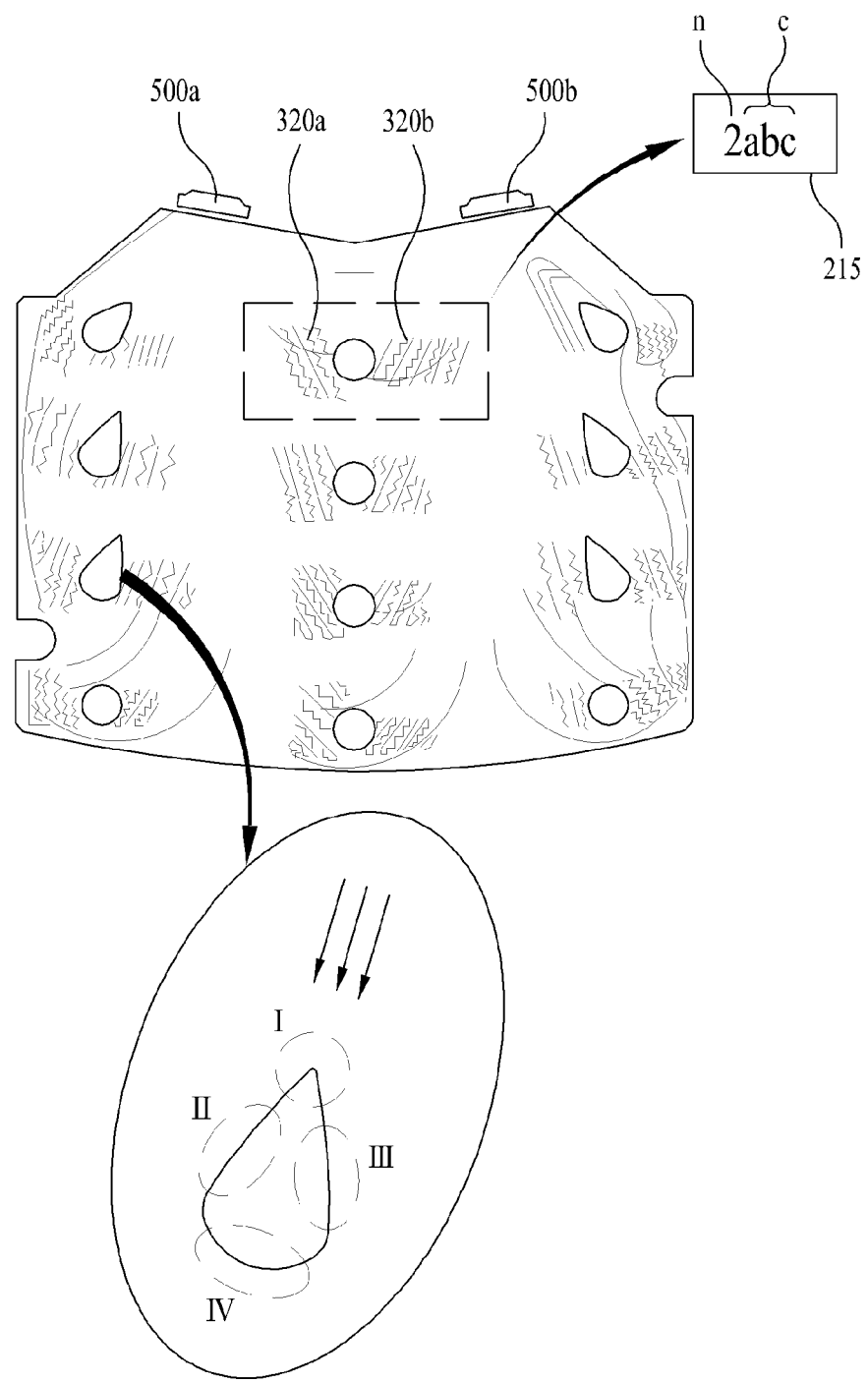
FIG. 6 is a layout for an example of a light guide film according to the present invention.

FIG. 6 is a layout for an example of a light guide film 300 according to the present invention.

Referring to FIG. 6, incident light enters the light guide film 300 from a light source 500 provided to a lateral edge portion of the light guide film 300. As mentioned in the foregoing description, the light guide film 300 is provided as a transparent sheet and can be formed of polycarbonate, polyurethane or the like. If an incident angle of the light provided by the light source 500 is greater than a prescribed angle, the light is totally reflected to be supplied to a region below the manipulating button 215 of the keypad 200.

The light source 500, as shown in FIG. 6, is arranged in the vicinity of a lateral side of the light guide film 300 and can include an LED or the like. If the light source 500 includes a plurality of LEDs, at least two LEDs 500a and 500b can be provided in the vicinity of the light guide film 300 by being spaced apart from each other.

The light source 500 can be loaded in the PCB 400 having the dome switch 415 and the electrode part 435. At least one or more light sources are provided to supply illumination to each of the manipulating buttons 215.

Yet, as a size of the keypad 200 increases and the number of the manipulating buttons is incremented, it is difficult to obtain uniform illumination effect with an illumination supplied by a single light source 500. Although it may be able to adopt a large-scale light source 500 to obtain sufficient illumination effect, it may increase a thickness of a mobile terminal overall. Preferably, light sources 500 of proper capacity are installed by being spaced apart from each other, whereby the light provided by the corresponding light source 500 can be uniformly supplied to the region below the corresponding manipulating buttons 215.

According to the embodiment shown in FIG. 6, the LEDs are arranged in directions differing from each other, respectively. If the light sources 500 are loaded on the same straight line or in parallel with each other, there can exist a blind spot to which the light is not supplied by the light guide film 300. To minimize the blind spot, it is able to install the LEDs in pattern of 'V'.

Therefore, it may cause a problem that the manipulating button 215 located at a right side, a left side, an edge side or a lower side among a plurality of the manipulating buttons 215 provided to the keypad 200 may look relatively dark. Yet, this problem can be solved to some extent in a manner of adjusting the arranged direction of the LEDs, as mentioned in the above description.

The illumination supplied to the manipulating button 215 located in a center column among a plurality of the manipulating buttons 215 shares the lights provided by the left and right LEDs. Therefore, it is able to approximately satisfy the light intensity shortage that may be generated according to an installation direction of the corresponding LEDs.

The light guide film 300 performs a function of illuminating the manipulating button 215 using the light totally reflected in its cross-sectional direction. Therefore, the totally reflected light should form an image so that the totally reflected light can be emitted below each of the manipulating buttons 215.

As the totally reflected light forms an image on the pattern part 320 to supply the light to the numeral, character and/or symbol marked on the corresponding manipulating button 215 above the formed image, the pattern part 320 can be formed in various forms.

For instance, the pattern part 320 can include micro-grooves formed on a surface of the light guide film 300, and more particularly, a set of patterns. The pattern part 320 should be located to oppose the numeral, character and/or symbol that should be marked on the corresponding manipulating button 215. The pattern part 320 located within a box indication of the light guide film 300 shown in FIG. 6 is provided to a position opposing the numeral '2' and the characters 'abc' marked on the keypad 200 to illuminate the corresponding numeral or characters.

A form of the pattern part 320 can be variously changed according to sizes or positions of the numeral, character and/or symbol.

The keypad 200 can include a plurality of manipulating buttons. Each of the manipulating buttons is represented to enable the lights provided by the LEDs 500*a* and 500*b* to transmit the numeral, character and/or symbol.

The pattern part 320 located within the box can be divided into a left pattern part 320*a* and a right pattern part 320*b* centering on the aforesaid insertion hole 310. The left pattern part 320*a* is the pattern part 320 for the numeral '2', while the right pattern part 320*b* is the pattern part 320 for the characters 'abc'.

In particular, the pattern part 320 is provided to a portion corresponding to the numeral, character and/or symbol of the manipulating button. And, density of patterns configuring the pattern part 320 can be configured in inverse-proportion to a distance from the LED located in shortest distance among the LEDs. Details of the density of the patterns configuring the pattern part 320 shall be described later.

The button protrusion 255 shown in FIG. 5 is preferably provided beneath a region on which the numeral, character and/or symbol of the manipulating button is not marked. Consequently, the button protrusion 255 is preferably provided to a position opposing a center portion of the manipulating button and the numeral, character and/or symbol is preferably marked on a left or right region of the manipulating button. Hence, the pattern part 320 can be provided to the left or right region of the insertion hole as well.

The insertion hole 310 is a hole through which the button protrusion provided to the bottom of the keypad 200 passes.

Some of the insertion holes provided to the right and left sides among the whole insertion holes 310 are configured to have water drop shapes, respectively. The reason why the shape of the insertion hole 310 is configured in the water drop shape is explained as follows.

First of all, the image formation of the light provided by the light source 500 occurs on an inner wall surface of the insertion hole as well as the pattern part 320. For instance, in case that the insertion hole 310 is configured in a circular shape like the former insertion hole 310 located in the center column, the image formation of the light occurs on the inner circumference of a semi-circle close to the light source 500 in the inner circumference of the circular insertion hole 310, whereby light is emitted.

Yet, since the inner circumference of the other semi-circle in the opposite direction of the light source 500 has less intensity of the arriving light, a quantity of light emission is much smaller than that of the inner circumference of the semi-circle close to the light source 500.

Therefore, a deviation of brightness of one manipulating button 215 increases. As it is preferable that brightness of one manipulating button is uniform, it is able to change the shape of the insertion hole 310 to solve such a problem.

Referring to the enlargement diagram of the insertion hole shown in the lower part of FIG. 6, if an area near the insertion hole 310 is partitioned into a region I, a region II and a region III, like the case that the shape of the insertion hole 310 is circular, the image formation of light is intensively generated from the inner circumference of the region I close to the light source 500.

In particular, since the region I is the portion closest to the light source 500, the light having an incident angle smaller than that corresponding to a total reflection condition in the light arriving at the region I results in image formation on a boundary of the inner circumference of the insertion hole 310, thereby shining bright.

Therefore, in order to minimize a size of the region, in which image formation is easily generated, closest to the light source 500, the shape of the insertion hole 310 can be configured to have a shape of water drop.

As mentioned in the foregoing description, the insertion hole 310 having the shape of water drop means a case that a width of a hole differs from a length thereof. And, it also means that the width of the insertion hole increases and then decreases in a length direction of the insertion hole.

In particular, when the insertion hole 310 having the water drop shape is formed, a portion having a smallest width (hereinafter named 'one length-direction end portion', which corresponds to the region I) is set to face the closest light source 500. Hence, it is able to minimize a size of a brightest region among the light-emitting regions around one insertion hole 310.

In particular, the one length-direction end portion of the insertion hole 310 having a width different from a length can be formed to face a center portion of the light source located in a shortest distance among the light sources.

As the one length-direction end portion of the insertion hole 310 is set to face the light source located in the shortest distance among the light sources, a direction of a vertex of the insertion hole 310 provided to the first column shown in FIG. 6 is located at a position rotated counterclockwise toward a lower part.

And, image formation of the light or total reflection of the light occurs in the region II or the region II near the insertion hole 310 or on the boundary in-between. In this case, the light may be directly provided by the light source 500 or can be supplied by being scattered or reflected on the pattern part 320.

The region IV can be named the other length-direction end portion (i.e., a portion corresponding to the region IV) of the insertion hole. And, the image formation of the light supplied by being scattered and reflected on a peripheral pattern part 320 and the like occurs in the region IV.

Since the other length-direction end portion (i.e., the portion corresponding to the region IV) of the insertion hole 310 has light intensity smaller than that supplied to the one length-direction end portion (i.e., the portion corresponding to the region I), it may look relatively dark. In order to increase an image-formation area or brightness, a width of the other length-direction end portion (the portion corresponding to the region IV) can be set greater than that of the one length-direction end portion (the portion corresponding to the region I).

By the above method, it is able to minimize the brightness deviation of the manipulating button 215 in a manner of reducing a size of a brightest region to become smaller than that of a case that the insertion hole 310 is formed circular.

Moreover, the insertion hole having the water drop shape having width and length differing from each other in size can be formed in the vicinity of a lateral side, on which light is not incident from the light source) of the edge portion of the light guide film 300. In particular, the insertion hole having the water drop shape having width and length differing from each other in size can include an insertion hole provided to the edge portion of the light guide film 300.

According to the embodiment shown in FIG. 6, the insertion holes 310 located in the center column among the whole insertion holes 310 are configured in circular shape. Since the light sources 500 are provided to the left and right sides by being spaced from each other according to the embodiment shown in FIG. 6, it is possible that the insertion holes 310 located in the center column have brightness deviation, which is caused by a specific light source 500, smaller that of the insertion holes 310 located in the edge area. To solve this matter, it is able to configure the insertion holes 310 not to have the water drop shape.

In particular, if the insertion hole 3110 needs to be formed in a water drop shape having width and length differing from each other in size, it corresponds to a case that brightness deviation neat the insertion hole is dominantly affected by a specific light source, i.e., one end portion of the insertion hole is set to face a center portion of a light source located nearest to the corresponding insertion hole among a plurality of light sources to minimize the brightness deviation caused by the specific light source. Therefore, if the brightness deviation does not occur in a specific direction intensively, the corresponding insertion hole may not be formed in the water drop shape.

Therefore, the insertion holes 310, which are formed in the edge area of the light guide film 300, and more particularly, in the vicinity of the lateral side on which the light is not incident from the light source in the lateral sides of the light guide film 300, among the insertion holes 310 provided to the light guide film 300 shown in FIG. 6 can be formed to have the water drop shapes.

Figure 7:
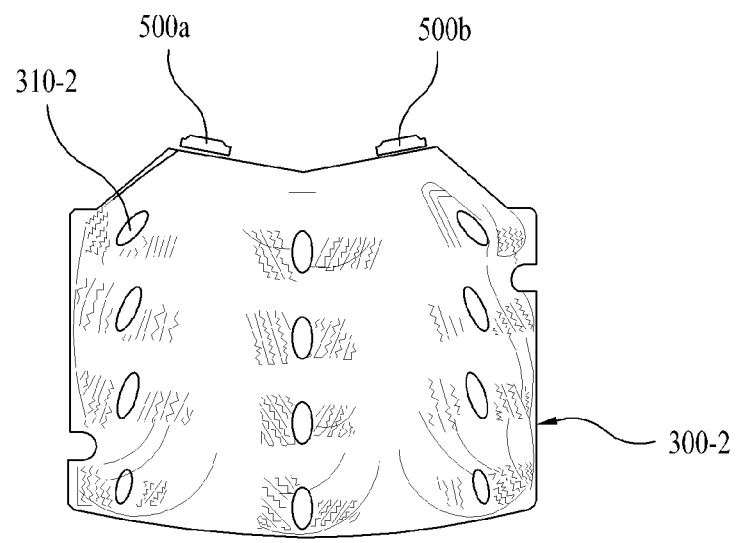
FIG. 7 is a diagram of a light guide film provided to a mobile terminal according to another embodiment of the present invention.

FIG. 7 is a diagram of a light, guide film 300 provided to a mobile terminal according to another embodiment of the present invention. Descriptions of components overlapped with the former components shown in FIG. 6 are omitted from the following description.

Referring to FIG. 7, insertion holes 310 provided to the light guide film 300 have oval shapes rather than the water drop shapes. Likewise, the width of the insertion hole differs from the length of the insertion hole. And, the width of the insertion hole increases in length direction and then decreases. Moreover, one length-direction end portion can be set to face a center portion of a light source.

This is to minimize overall brightness deviation by minimizing a size of a brightest portion of one insertion hole 310.

The latter light guide film 300 shown in FIG. 7 differs from the former light guide film 300 shown in FIG. 6 in a greatest width of the insertion hole 310, i.e., a position of a portion through which the button protrusion 255 provided to the bottom of the keypad 200 passes.

The insertion hole 310 of the light guide film 30 shown in FIG. 6 has the water drop shape of which width increases and then decreases abruptly. Yet, an increasing rate of the width of the insertion hole 310 of the light guide film 300 shown in FIG. 7 is similar to a decreasing rate thereof.

Thus, by modifying a shape of the insertion hole 310, the light guide film 300 shown in FIG. 6 or FIG. 7 enables the button protrusion 255 of the keypad 200 to directly pressurize the dome switch 415. Therefore, it is able to minimize the brightness deviation that may be caused by the formation of the insertion hole 310.

Figure 8:
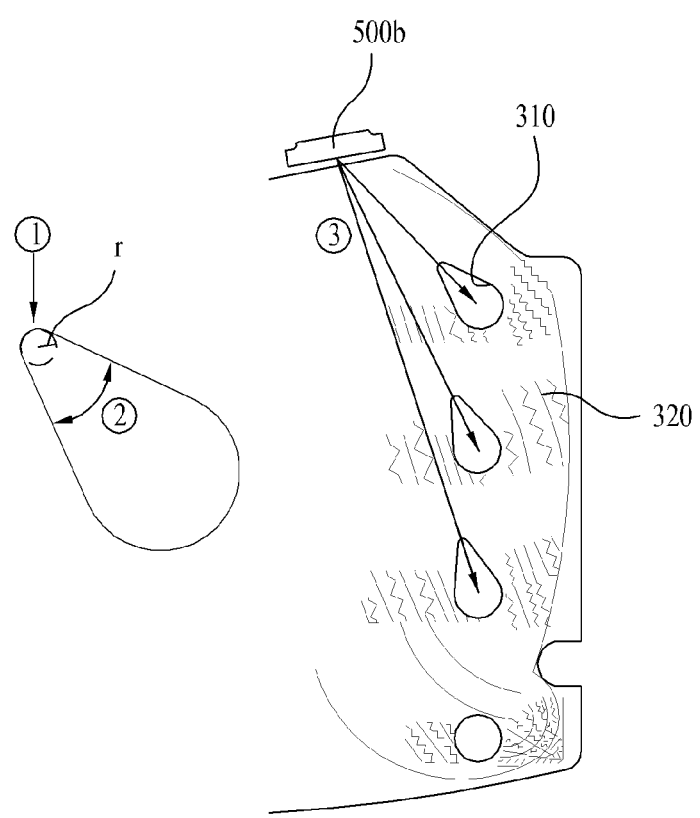
FIG. 8 is an enlarged diagram and partial layout of an insertion hole of the light guide film shown in FIG. 6.

FIG. 8 is an enlarged diagram and partial layout of the insertion hole 310 of the light guide film 300 shown in FIG. 6.

Referring to FIG. 8, one length-direction end portion of the insertion hole 310 can be rounded. Preferably, an inner radius of the rounded portion is set equal to or smaller than 0.5 mm [①]. Preferably, an angle in-between is set equal to or smaller than 45 degrees [②]. Preferably, one length-direction portion can be set to face a light source 500 [③]. This is to minimize the light of which image formation occurs at the rounded one length-direction end portion.

Figure 9:
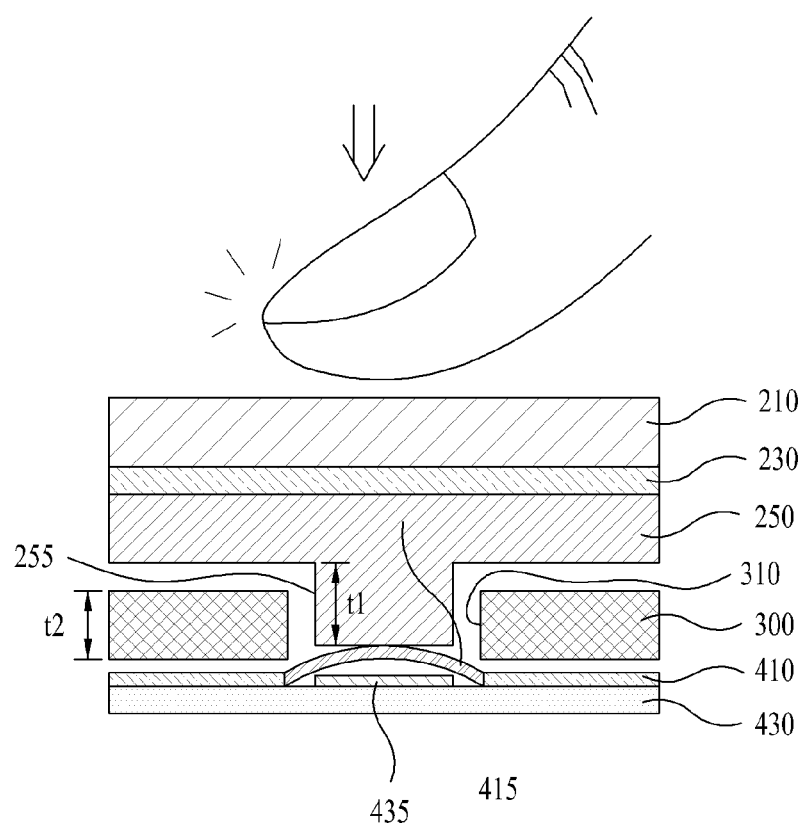
FIG. 9 is a cross-sectional diagram of a user input unit provided to a mobile terminal according to the present invention.

FIG. 9 is a cross-sectional diagram of a user input unit provided to a mobile terminal according to the present invention.

Referring to FIG. 9, a top plate having a plurality of manipulating buttons 215 is attached to a bottom plate 250 having a button protrusion via keypad film 230 to configure one keypad 200. The same descriptions made with reference to FIGS. 4 to 8 are omitted from the following description.

The button protrusion 255 projected from the bottom of the keypad 200 extends downward by passing through an insertion hole 310 of a light guide film 300 providing an illumination functionality by being inserted between a PCP 400 and the keypad 200.

If the manipulating button 215 of the keypad 200 is pressurized, the button protrusion 255 pressurizes the dome switch 415. The pressurized dome switch 415 then comes into contact with an electrode part 435 selectively to generate a control signal.

As the light guide film 300 is formed of a soft or flexible material, even if a projected height t1 of the button protrusion 255 is smaller than a thickness t2 of the light guide film 300, if a sufficient force is applied, the dome switch 415 can be pressurized. Yet, if the projected height t1 of the button protrusion 255 is set greater than or at least equal to the thickness t2 of the light guide film 300, it is able to enhance user's feel of manipulation.

In particular, the projected height of the button protrusion 255 can be set equal to or greater than the thickness of the light guide film 300.

Figure 10:
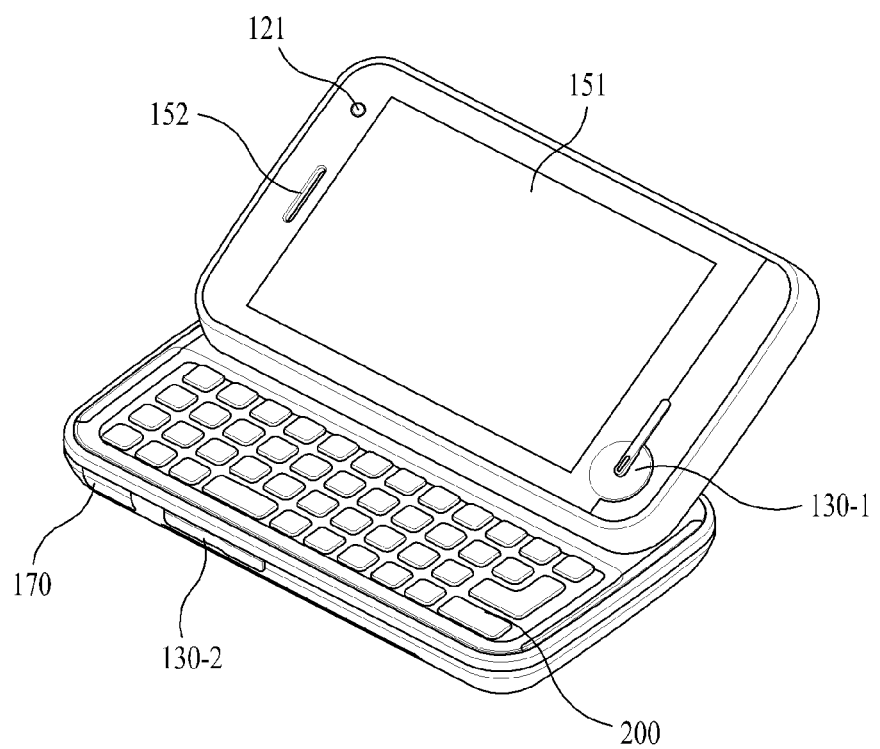
FIG. 10 is a diagram of a display unit 151 provided to a first body 100A according to an embodiment of the present invention.

FIG. 10 is a diagram of a mobile germinal according to another embodiment of the present invention.

Referring to FIG. 10, like the former embodiment shown in FIG. 2 or FIG. 3, a mobile terminal shown in FIG. 10 can include a first body 100A and a second body 100B configured slidable along at least one direction. Of course, the first body 100A and the second body 100B can be rotatably hinged on each other.

Like the former embodiment shown in FIG. 2 or FIG. 3, a closed configuration may indicate a state that the first body 100A is positioned to be overlapped with the second body 100B. And, an open configuration may indicate a state that the first body 100A is positioned to expose at least one portion of the second body 100B.

FIG. 10 shows the open configuration. Moreover, if the mobile terminal becomes slidably open in a manner that the first body 100A exposes the second body 100B, the first body 100A can be unfolded with inclination at a predetermined angle.

The second body 100B is provided with a keypad 200 as a user input unit including a plurality of manipulating buttons.

According to the embodiment shown in FIG. 10, a display 151 can be provided to the first body 100A.

The display 151 can include at least one of a liquid crystal display (LCD), a thin film transistor-liquid crystal display (TFT LCD), an organic light-emitting diode (OLED), a flexible display, a 3D display and the like. Some of these displays can be configured as a transparent o light-transmittive type to be viewed externally. Such a display can be named a transparent display. For representative example of the transparent display, there is a transparent OLED (TOLED) or the like.

The display 151 occupies a front side of the first body 100A. In case that the display 151 and a sensor for detecting a touch action (hereinafter called a touch sensor) construct a mutual layer structure (hereinafter named a touchscreen), it is able to use the display 151 as an input device as well as an output device. In this case, the touch sensor can include one of a touch film, a touch sheet, a touchpad and the like.

The touch sensor can be configured to convert a pressure applied to a specific portion of the display 151 or a variation of electrostatic capacitance generated from a specific portion of the display 151 to an electric input signal. The touch sensor can be configured to detect a pressure of a touch as well as a touched position and size. If there is a touch input for the touch sensor, signal(s) corresponding to the touch input is sent to a touch controller. The touch controller processes the forwarded signal(s) and then transfers data corresponding to the processes signal(s) to the controller 180. therefore, the controller 180 can be aware which region of the display 151 is touched.

Each of the first and second bodies 100A and 100B can include a user input unit 130-1/130-2 for performing a special function. Descriptions overlapped with the former descriptions with reference to FIG. 2 and FIG. 3 are omitted from the following description.

The keypad 200, which is the user input unit provided to the second body 100B, includes a plurality of manipulating buttons in a plurality of rows and columns.

The manipulating buttons can be arranged in QWERTY type. In particular, the manipulating buttons can be arranged in a manner that major characters are actually configured identical to those of a computer keyboard.

In case that the QWERTY type keypad shown in FIG. 10 is provided, it is able to provide the illumination functionality as well. Since the configuration of the keypad 200 can be identical to the former description with reference to FIG. 4 and FIG. 5, the overlapped description is omitted from the following description.

FIGS. 11 to 13 show light guide films applicable to the mobile terminal shown in FIG. 10 according to various embodiments.

FIG. 11 shows a case that total 4 light sources of LEDs (500a, 500b, 500c, 500d) provided to an upper lateral side of the light guide film 300-3.

The light guide film is provided with insertion holes 310a and 310b corresponding to manipulating buttons, respectively.

A prescribed one 310a of a plurality of the insertion holes 310a and 310b may have width and length differing from each other in size.

Like the former embodiments, the insertion hole 310a can have a shape of which width increases in a length direction and then decreases. For instance, the insertion hole 310a can have an oval or water drop shape.

As mentioned in the foregoing description with reference to FIG. 6, since the image formation of light is intensively generated from the inner circumference close to the light source, the insertion hole can be set to have a water drop shape to minimize a size of a region closest to LEDs 500a, 500b, 500c and 500d as light sources.

Moreover, one end portion in the length direction end portion of the insertion hole 310 can be set to face the light source in shortest distance among the light sources.

The LEDs 500a, 500b, 500c and 500d as the light sources are provided in a manner of being spaced apart from each other in the vicinity of an upper lateral side of the light guide film. And, one length-direction end portion of the insertion hole 310a can be arranged toward the center portion of the light source located in shortest distance among the light sources.

A prescribed one 310b of the insertion holes 310a and 310b can have a circular shape.

The insertion hole 310b, as shown in FIG. 6 (a), has a circular shape. If a major LED located in shortest distance does not exist at a position inclining to the insertion hole, the insertion hole van have a circular shape. For instance, in case of the light guide film shown in FIG. 6 (a), a shape of the insertion hole located in the same column of each of the LEDs 500a, 500b, 500c and 500d is circular.

N other words, the circular insertion hole can be provided to a position where a plurality of LEDs are provided in the same distance.

Since the light provided by the LED 500a located in the same column of each insertion hole 310b may interfere with the insertion hole located in the same column, brightness deviation of light may not be considerable. Since it is not always necessary to configure a shape of the insertion hole to have width and length differing from each other, the shape of the insertion hole can be configured to have a circular shape.

If a distance between the LED and the insertion hole 310b' is considerably long, brightness deviation per region may not be considerable, as mentioned in the foregoing description with reference to FIG. 6. Therefore, the shape of the insertion hole can be configured to have a circular shape.

Therefore, according to the embodiment shown in FIG. 11 (*a*), the insertion hole 310*a'* formed in a lowest row can have the circular shape despite not being formed in the same column of the insertion hole 310*b*.

A shape of an insertion hole provided to a light guide film 300(2) shown in FIG. 11 (*b*) has width and length differing from each other. Yet, this insertion hole can have an oval shape of which widths of both length-direction ends are approximately equal to each other.

One length-direction end portion of the oval type insertion hole 310 can be configured to face a center portion of one of the LEDs 500*a*, 500*b*, 500*c* and 500*d* located in a shortest distance. Hence, directionality of both length-direction end portions of an insertion hole having width and length differing from each other in size may not be differentiated.

As mentioned in the foregoing description, a pattern part including a plurality of patterns is provided in the vicinity of the insertion hole of each of the light guide films 300(1) and 300(2), which are shown in FIG. 11 (*a*) and FIG. 11 (*b*), respectively.

Each of the patterns configuring the pattern part can include a scratch or groove formed on a surface of the corresponding light guide film.

Density of the patterns configuring the pattern part can be set proportional to a distance from the LED located in a closest distance. As the distance from the LED increases, the light intensity becomes insufficient. Hence, the density of the patterns configuring the pattern part can be raised in proportion to the distance from the LED as well.

In particular, since each LED can be provided to one lateral side of the light guide film, a corresponding manipulating button in the vicinity of the other lateral side may be relatively dark.

In order to minimize brightness deviation, the density of the patterns configuring the pattern part is set proportional to the distance from the LED. Therefore, the brightness deviation can be minimized.

A method of increasing the density of the patterns configuring the pattern part can include the step of forming the patterns configuring the pattern part more densely.

The patterns configuring the pattern parts 320*a* and 320*b* of the light guide film shown in FIG. 11 can have various line shapes. If the pattern is configured with a surface scratch, it is able to increase pattern density of the pattern part in a manner that a total length of the pattern configuring one of the pattern parts 320*a* and 320*b* is set proportion to the distance from the LED.

FIG. 12 shows a case that total 3 light sources of LEDs (500*a*, 500*b*, 500*c*) provided to an upper lateral side of the light guide film. Description overlapped with the former description with reference to FIG. 11 is omitted from the following description.

Referring to FIG. 12, at least some of insertions holes shown in the drawing have width and length differing from each other in size. Each LED 500*a*/500*b*/500*c* is arranged between columns formed by insertion holes instead of being formed on a column formed by the insertion holes. Therefore, light interference caused by the insertion holes can be reduced. And, it is also able to reduce the number of LEDs.

Thus, each of the insertion holes can have directionality toward the LED. Of course, the shapes of the insertion holes located in the lowest row, and more particularly, in a distance farthest from the LED among the insertion holes provided to the light guide film shown in FIG. 12 (*b*) can be configured to have a circular shape of which width and length are equal to each other due to the same reason explained in the foregoing description.

The embodiment shown in FIG. 12 is more advantageous than the former embodiment shown in FIG. 11 in that the number of LEDs 500*a*, 500*b* and 500*c* of the light sources can be decremented.

Referring to FIG. 12 (*b*), some 310*a* of insertion holes can be configured to have an oval shape of which width and length differ from each other in size. As some 310*b* of the insertion holes are sufficiently distant from LEDs 500*a*, 500*b* and 500*c*, they can be formed circular.

In particular, a distance between the circular insertion hole 310*b* and the LED located in a shortest distance can be equal to or greater than a predetermined distance.

FIG. 13 shows a case that light sources of LEDs provided to upper, right, left and lower lateral sides of the light guide film.

Referring to FIG. 13, the LEDs can be provided in the vicinity of at least two of upper side, lower side, left side and right side of the light guide film. And, insertion holes provided to one light guide film can have shapes of at least two types.

Since the light guide films 300(5) and 300(6) can be mainly adopted for a small-size mobile terminal, its size is not large, brightness reduction according to a distance from an LED as a light source may not be considerable. Yet, in case that a keypad increases in size, the light guide film can have an increasing size. Therefore, limitation is put on reducing brightness deviation by a shape of an insertion hole or density of patterns configuring a pattern part.

According to the embodiment shown in FIG. 13, LEDs are arranged in the vicinity of at least two lateral sides of the light guide film 300(6) or 300(6) instead of one lateral side (e.g., upper lateral side) thereof. Therefore, overall brightness of illumination is raised, while brightness deviation can be reduced.

According to the embodiment shown in FIG. 13 (*a*), LEDs 500*a*, 500*b*, 500*c*, 500*d* and 500*e* can be provided in the vanity of upper, left and right lateral sides of the light guide film 300(5). According to the embodiment shown in FIG. 13 (*b*), LEDs can be provided in the vanity of upper, left, right and lower lateral sides of the light guide film 300(6).

In this case, the brightness deviation in the vicinity of each insertion hole is dominantly affected by the light provided by the closest LED.

Hence, an insertion hole having width and length differing from each other in size can be configured in a manner that directionality of one or both length-direction end portions is set to face the closes LED.

In case that LEDs are provided in a similar distance, both length-direction ends of an insertion hole having width and length differing from each other in size can be configured to face the corresponding LEDs, respectively. According to the embodiment shown in FIG. 13 (*a*), a specific insertion hole 310*a* can be configured to have an oval shape of which both length-direction ends have directionality toward specific LEDs 500*a* and 500*e*, respectively. In this case, the specific insertion hole 310*a* can be configured to have an oval shape instead of a water drop shape of which one end width is smaller than the other end width.

An insertion hole 310*b* except the specific insertion hole 310*a* is configured to have a water drop shape of which one end width is smaller than the other end width. In this case, a narrower end can be formed to face a center portion of a near light source. If the specific insertion hole 310*a* is located sufficiently far from each light source, it can be configured to have a circular shape.

Accordingly, the present invention provides the following effects and/or advantages.

First of all, the present invention enhances a manipulating feel of a keypad and minimizes deviation of keypad illumination brightness.

Secondly, the present invention solves a problem of loss a keypad manipulating feel, a problem of deviation of keypad illumination brightness and the like and is also able to reduce a thickness of a mobile terminal for slim implementation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    at least one or more light sources;
    a keypad having a plurality of manipulating buttons, each having a button protrusion provided to a bottom of the corresponding manipulating button;
    a light guide film having a plurality of insertion holes configured to have the button protrusions pass through, respectively, and light provided by the at least one or more light sources entering a lateral side thereof; and
    a PCB (printed circuit board) having a dome switch pressurized by the button protrusion of the keypad and an electrode part selectively coming into contact with the dome switch,
    wherein a width of at least one insertion hole among the plurality of insertion holes of the light guide film is different from a length thereof, and the width increases in a length direction of the corresponding insertion hole and then decreases,
    wherein the at least one or more light sources are provided in a vicinity of the lateral side of the light guide film,
    wherein one length-direction end portion of the at least one insertion hole having the width and the length differing from each other is arranged towards a center portion of the light source among the at least one or more light sources that has the shortest distance from the at least one insertion hole having the width and the length differing from each other,
    wherein the at least one insertion hole has an oval shape, or a water drop shape having one length-direction end narrower than the other length-direction end, and the at least one insertion hole is symmetrical along at least one axis of symmetry, and
    wherein the at least one axis of symmetry is directed towards the at least one or more light sources.

2. The mobile terminal of claim 1, wherein the at least one or more light sources provided in the vicinity of the lateral side of the light guide film includes at least two light sources spaced from each other.

3. The mobile terminal of claim 1, wherein the at least one insertion hole having the width and the length differing from each other is provided at an edge portion of the light guide film.

4. The mobile terminal of claim 1, wherein a projected height of the button protrusion is greater than a thickness of the light guide film.

5. A mobile terminal comprising:
    a plurality of LEDs;
    a keypad having a plurality of manipulating buttons having a plurality of button protrusions provided to bottoms thereof, respectively;
    a light guide film having at least one pattern part configured with a plurality of patterns and a plurality of insertion holes having the button protrusions pass through, respectively, and light provided by at least one of the LEDs entering a lateral side thereof; and
    a circuit board having a plurality of dome switches pressurized by the button protrusions of the keypad, respectively,
    wherein a width of at least one insertion hole among the plurality of insertion holes provided in the light guide film is different from a length thereof, and the width increases in a length direction of the corresponding insertion hole and then decreases,
    wherein the width increases in a length direction thereof and then decreases,
    wherein a narrower of the length-direction end portions of the at least one insertion hole having the width and the length differing from each other is configured to face the at least one LED among the plurality of LEDs that is the shortest distance from the at least one insertion hole having the width and length differing from each other,
    wherein the at least one insertion hole has an oval shape, or a water drop shape having one length-direction end narrower than the other length-direction end, and the at least one insertion hole is symmetrical along at least one axis, and
    wherein the at least one axis of symmetry is directed towards the at least one LED among the plurality of LEDs.

6. The mobile terminal of claim 5, wherein the plurality of the LEDs are provided in a vicinity of the lateral side of the light guide film by being spaced apart from each other.

7. The mobile terminal of claim 5, wherein a numeral, character and/or symbol is respectively marked on each of the plurality of manipulating buttons to transmit the light provided by each corresponding LED among the plurality of LEDs,
    wherein the at least one pattern part is provided to a portion opposing the numeral, character and/or symbol of at least one manipulating button among the plurality of manipulating buttons, and
    wherein the density of a plurality of the patterns configuring the at least one pattern part is inversely proportional to a distance from the LED among the plurality of LEDs that is the shortest distance from the at least one insertion hole having the width and length differing from each other.

8. The mobile terminal of claim 7, wherein each of the button protrusions is provided under a region in which the numeral, character and/or symbol of the corresponding manipulating button is not marked.

9. The mobile terminal of claim 8, wherein each of the button protrusions is provided at a position opposing a center portion of the corresponding manipulating button and wherein each numeral, character and/or symbol is marked in either a left or right region of the corresponding manipulating button.

10. The mobile terminal of claim 9, wherein the at least one pattern part is provided to either a left or right region of the corresponding insertion hole.

11. The mobile terminal of claim 5, wherein the at least one pattern part comprises a plurality of the patterns and wherein each of a plurality of the patterns comprises a scratch formed on a surface of the light guide film.

12. The mobile terminal of claim 5, wherein at least one of the plurality of the insertion holes has a circular shape.

13. The mobile terminal of claim 12, wherein the at least one circular insertion hole is provided at a position where at least one LED among the plurality of the LEDs is provided.

14. The mobile terminal of claim 12, wherein a distance between the at least one circular insertion hole and the LED located in the shortest distance from the at least one circular insertion hole is equal to or greater than a predetermined distance.

15. The mobile terminal of claim 5, wherein a plurality of the LEDs are provided in a vicinity of at least two LEDs among the plurality of LEDs consisting of upper, lower, left and right lateral sides of the light guide film.

16. The mobile terminal of claim 15, wherein each insertion hole among the plurality of the insertion holes provided in the light guide film has a shape of at least one type among two types.

* * * * *